Jan. 5, 1932.  L. HEIDMANN  1,839,312
ELECTRICAL SWITCHING APPARATUS
Filed Oct. 11, 1928    2 Sheets-Sheet 1

Inventor:—
Leon Heidmann,
By:— Smith & Michael,
Attorneys.

Jan. 5, 1932.   L. HEIDMANN   1,839,312
ELECTRICAL SWITCHING APPARATUS
Filed Oct. 11, 1928   2 Sheets-Sheet 2

Inventor:—
Leon Heidmann,
By:— Smith & Michael,
Attorneys.

Patented Jan. 5, 1932

1,839,312

UNITED STATES PATENT OFFICE

LÉON HEIDMANN, OF PARIS, FRANCE, ASSIGNOR TO FORGES & ATELIERS DE CONSTRUCTIONS ELECTRIQUES DE JEUMONT, SOCIETE ANONYME, OF PARIS, FRANCE, A FRENCH JOINT-STOCK COMPANY

ELECTRICAL SWITCHING APPARATUS

Application filed October 11, 1928, Serial No. 311,902, and in France November 19, 1927.

This invention relates to an operating system for producing step-by-step rotary movements in the operation of electrical switching apparatus, for example control switches for high-power traction equipments, in which the control of the motors is effected by contactors actuated in the desired order by a cam shaft. The invention may also be applied to the operation of other analogous electrical apparatus such as rheostat controls, battery-switching systems and the like.

The invention has for its object to provide an improved operating system in which the step movement is produced in a positive and accurate manner by an electric motor, and in which upon completion of each step the driven member is latched in an equally positive and accurate manner, and at the same time the rotary motor is brought progressively to rest.

The invention provides for shockless engagement of the driving means with the driven member, thereby permitting the stepwise movements to be carried out as rapidly as desired, the driven member being operated during each step at a speed which is variable but not discontinuous at any point.

The invention has for another object to facilitate the reversal of the rotary motor in order to permit the stepwise movement of the operated member to be reversed as and when required.

The invention is hereafter more fully described and claimed, with reference to the accompanying drawings, in which:—

Figure 1:
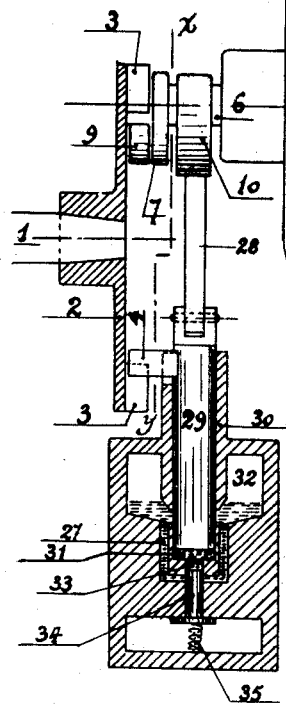
Figure 1 is a general view showing the actuating mechanism.
Figure 1:
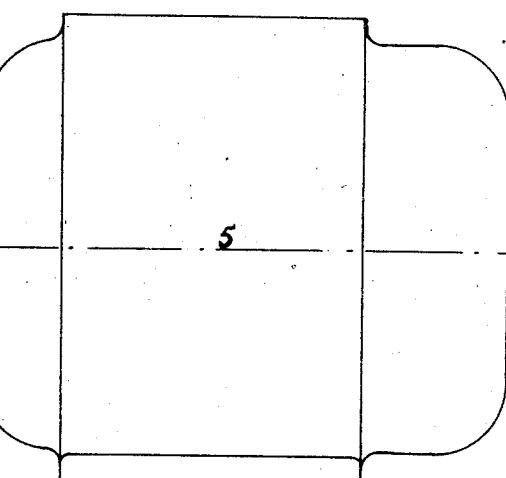

The invention is shown and described in its application to the cam shaft of a high-power electric traction equipment, in which the various power circuits are controlled in the well known manner by contactors operated by said cam shaft. In such apparatus, the cam shaft usually receives its movement step by step either from one or more pistons actuated by compressed air, or from an electric motor by means of suitable speed reducing gear, or again from electromagnets. In the operating system according to the present invention, the cam shaft receives its step-by-step movement from an electric motor; this system comprises the actual driving mechanism for actuating the cam shaft by the motor, an improved latching device for the cam shaft, particular circuit connections for the feed to the electric motor, and improved stopping means for the driving shaft.

Referring to the accompanying drawings, the same reference numerals or letters designate the same parts; as regards Figures 1—5 and 6, it has been assumed that the constituent elements of the actuating system occupy their positions of rest.

Figure 2:
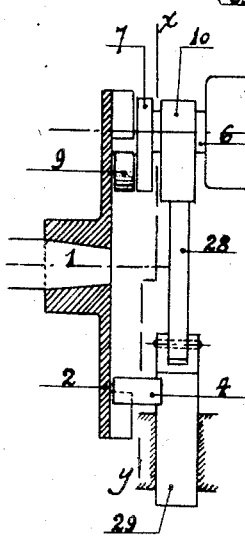
Figure 2 is an analogous view showing merely the mechanism for actuating the camshaft by the motor together with the latching device.

1 represents the cam shaft which it is desired to actuate step by step in one direction or the other; in Figures 1 and 2, it is supposed by way of example that there are eleven positions or steps to be provided.

At the extremity of the shaft 1, there is keyed a disc 2 having a flange or crown in which are cut eleven equidistant radial notches (see Figures 3 and 4), in such a way as to leave eleven exactly similar and equidistant teeth 3 projecting from the disc. A latching member 4, operated as explained hereafter, can engage in one of these notches and thereby hold the camshaft in a given position.

The electric driving motor 5 carries at the end of its shaft 6 a disc crank 7 of which the crank pin 8 is provided with a roller 9, the whole being arranged in such a way that the roller 9 can engage tangentially in one or other of the notches on either side of the tooth 3 which is diametrically opposite to the latch 4.

An eccentric 10, a cam or any other equivalent device, keyed upon the shaft 6 of the motor 5, operates the latch 4, by means of a rod 28 hinged upon a movable guiding member 29, in such a way that this latch is disengaged when the roller 9 engages in a notch, and vice versa.

In these conditions, it is seen that if the shaft 6 of the motor 5 makes one revolution, the cam shaft 1 is engaged by the roller 9, unlatched, rotated for one eleventh of a revolution, and then latched again, and that the direction of rotation of the cam shaft is the same as that of the motor 5.

Referring to Figures 1, 2 and particularly 3 and 4 of the drawings, it will be seen that:—

Starting from the position of rest shown, if the motor 5 revolves in the direction of the arrow F, it drives its shaft 6, the crank 7, and therefore the roller 9, the latter moving first of all from the position $a$ to the position $b$, without exerting any action upon the disc 2; but during this angular displacement, the eccentric 10 by means of the parts 28, 29, has lifted the latch 4 free from the teeth 3 between which it was previously engaged.

At the moment when it attains the position $b$, the roller 9 engages tangentially with the tooth 3 located diametrically opposite to the latch 4, and begins to push this tooth (and therefore the disc 2) in the same direction as the arrow F.

The movement imparted to the disc 2 starts with a speed which is nil at the moment of engagement of the roller 9 and attains a maximum speed when the said roller 9 reaches the position $c$.

From this moment onwards, the speed communicated to the disc 2 by the roller 9, acting upon the flank of the tooth 3 in question, decreases progressively until the said roller 9 comes into the position $d$, corresponding symmetrically with the position $b$; at this moment the movement imparted by the roller 9 is again nil.

While the roller 9 traverses the arc $d\,a$, the latch 4 under the action of its eccentric 10 resumes its engaged position shown in the drawings.

This engagement having been effected, the disc 2 has been displaced in the example represented by precisely one eleventh part of a revolution.

The foregoing explanations will make clear the following conclusions:—

(1) Whatever be the speed of the roller 9, the disc 2 is initially engaged with nil speed, then actuated at a speed at first increasing and then decreasing, and finally disengaged or abandoned by the roller at nil speed; its movement is therefore carried out without shock. The latch 4 intervenes only in order to hold the disc 2 fast in the position which it has attained at nil speed.

(2) Since the movement takes place without shock, it can be rendered as rapid as desired.

(3) The displacement of the camshaft 1 from one notch to the next notch is effected in a precise manner.

(4) The different parts of the mechanism are of ordinary mechanical construction and easy to manufacture with accuracy. The fact that the same notches serve both for the actuation and for the latching of the cam shaft is likewise favorable to an accurate construction of the mechanism.

This device thus allows by means of a simple mechanism, of obtaining rapid, accurate and shockless movements of the camshaft, these being conditions essential for the correct operation of the electrical switch contractors and the satisfactory conservation of the whole mechanism.

Figure 5:
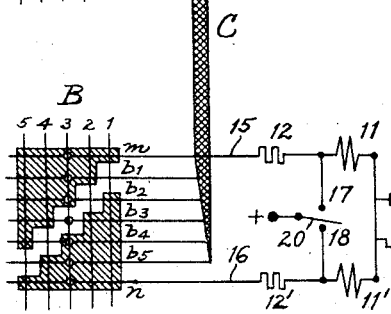
Figure 5 is a wiring diagram showing the feed connections to the electric motor driving the actuating mechanism.

The electric motor 5 may be of any suitable type, but it is preferable to utilize a series motor (direct current or single-phase current) having two field windings 11 and 11', Figure 5, each of these field windings being utilized separately for rotation in one direction or the other.

In series with each of these field windings 11 and 11', there is placed a starting resistance 12, 12'. The armature 13 is shunted by a resistance 14, the function of which is to maintain the saturation of the poles whatever be the load on the motor. The motor 5 has therefore substantially the speed characteristic of a shunt-wound motor. It might indeed be replaced by an ordinary shunt motor, but the series field connection as described has the advantage of allowing remarkably simple circuit connections, it being in fact only necessary to feed the motor 5 through one or other of the field windings 11, 11', from the point 15 or 16, in order to obtain rotation of the motor in one direction or the other.

In the diagram of Figure 5, there has been taken by way of illustration, the case of a cam-shaft having five positions, corresponding to five circuit connections of the electrical equipment controlled by the contactors.

Upon the cam shaft 1 there is secured a switch drum B, shown in development in Figure 5, having likewise five positions and being illustrated in its central position. The master controller A, similarly shown in development, has also five positions and is illustrated in its central position. This master controller is fed by a suitable source of current at +, and its five other contact fingers or brushes $a_1\ a_2\ a_3\ a_4\ a_5$ are connected respectively by the leads shown bunched at C to the like numbered contact fingers or brushes $b_1\ b_2\ b_3\ b_4\ b_5$ of the switch drum B. The two other fingers, marked $m$ and $n$, of this switch drum are connected to the points 15 and 16 so as to feed the motor armature 13 together with its shunt 14 through the resistance 12 or 12' and the field winding 11 or 11', according to the direction of motion required.

Figure 3:
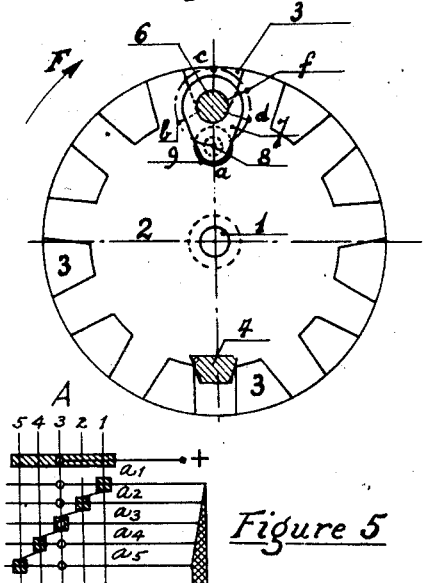
Figure 3 is a transverse section along the lines x—y of Figures 1 and 2.
Figure 4:
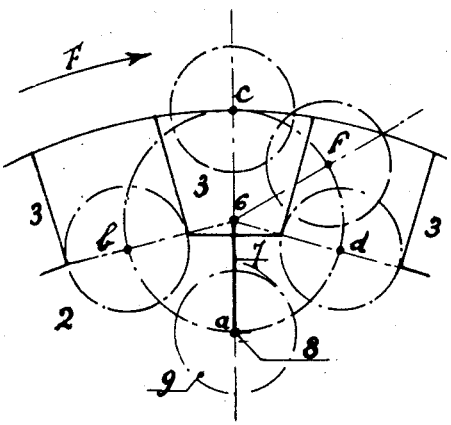
Figure 4 represents diagrammatically on a larger scale the main parts of the actuating mechanism.

It is however to be noted that the cut-off effected by the switch drum B as its contact members move clear of the fingers $b_1$ $b_2$ $b_3$ $b_4$ $b_5$ does not take place at the end of the step-movement of the cam shaft 1, but approximately at the middle of the step, due to the finger passing on to the gap between the two contact members, this occurring at the moment when the roller 9 occupies the position $c$ (Figures 3 and 4). In order to ensure the completion of the step movement, the feed to the motor 5 by the master controller A and the switch drum B is duplicated by a direct automatic feed at 17 and 18, effected by two contactors actuated by the shaft of the said motor 5. According to the direction of its rotation, one or other of these contactors comes into operation in order to feed the field winding 11 or 11' directly, at the moment when the roller 9 engages in a notch, and to cut off the feed current from the motor when this roller 9 leaves the same notch.

Figure 6:
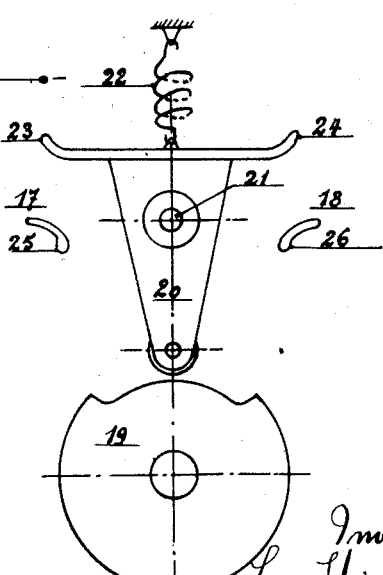
Figure 6 represents one of the feed contact devices for the said electric motor.

For this purpose, the shaft 6 of the motor 5 carries a cam 19, Figure 6, adapted to engage a lever 20 which can swing around an axis 21, being normally returned to its central position by a spring 22. This lever 20 carries the two movable contacts 23 and 24 of the contactors 17 and 18, the stationary contacts being represented at 25 and 26.

It will be seen that according to the direction of rotation of the motor 5, one or other of the contactors 17, 18 comes into operation.

Supposing that the cam shaft 1 is stationary in the central one of its five positions, the motor 5 being at rest, the roller 9 out of the notches, and the automatic feed switches 17, 18 open.

If the master controller A, as illustrated in Figure 5, is likewise in the central position, all the circuits are open and the apparatus remains at rest.

If the master controller is set to one extreme position for example so as to connect the positive lead (+) with the finger $a_5$, the latter will supply current through the corresponding lead in C to the finger $b_5$ and hence to the finger $n$ of the switch drum B, which in turn will feed the motor 5 by way of the point 16, through the resistance 12' and field winding 11'. The motor therefore begins to run and revolves the cam shaft in the direction to advance the switch drum B towards the right as viewed in Figure 5. As soon as the motor begins to revolve, the contactor lever 20 closes the automatic feed circuit at 18 for direct supply to the motor, this automatic feed circuit being re-established at the beginning of each succeeding revolution of the motor, until the required position is attained.

The movement continues so long as the finger $n$ is supplied by the finger $b_5$, that is until the latter passes on to the gap between the two parts of the switch drum. When this position is attained, the automatic feed circuit is still maintained by the contactor lever 20, but when the motor next brings its cam 19 into the position of Figure 6, the opening of the contact 18 will have cut off the automatic feed to the motor and the latter will come to rest under the action of the brake.

It will be apparent that by setting the master controller in the other extreme position, for example, the motor would revolve the cam shaft 1 in the opposite direction until reaching the position where the switch drum breaks the connection between the fingers $m$ and $b_1$, the movement being completed in this case by the automatic feed through the contact 17.

The purpose of the automatic feed is as follows:—

(1) To ensure the continuation of any movement once commenced, whatever be the movements or false movements effected with the combiner switch.

(2) To short-circuit the starting resistance 12 or 12' when the roller 9 enters its working phase.

(3) To cut off the feed from the motor 5 at a very exact point in its rotation and when the movement of the camshaft 1 is fully completed, which cannot be secured with a switch drum integral with the cam shaft.

(4) To ensure for certain the feed to the motor 5 throughout its working stroke, the master controller and the switch drum serving simply to initiate the movement of the said motor, but no longer intervening during its working stroke nor in particular for the break of the current.

It is to be noted that all the interruptions of current are effected by the automatic feed contactors 17 and 18; neither the master controller nor the switch drum cuts off the current. This feature allows of simplifying the construction of these parts.

By reason of inopportune movements of the master controller it may happen for example that feed is effected simultaneously at 16 by the master controller and at 17 by the contactor lever 20 providing automatic feed. This eventuality is of no account owing to the presence of the resistance 12' which ensures that the current in the field winding 11' remains negligible in proportion to the current in the field winding 11.

It is necessary to stop the motor 5 as soon as the movement of the camshaft 1 is terminated, the feed being cut off at 15 and 16 by the switch drum. In this respect there is available for the braking period the whole arc $d$ $a$ $b$ corresponding to the movement of the roller 9 clear of the notches upon the disc 2, Figures 3 and 4. It matters in fact very little what be the stopping position of the roller 9 provided that it is within this arc. It is therefore not necessary to stop the motor in a precise position and this latitude permits of effecting the stoppage by progressive braking, without shock or excessive fatigue of the parts.

In actual construction the mechanism can be arranged in such a way that the braking commences at 60° after the mid-stroke of the roller 9, viz, at $f$ in the case of right-hand rotation or in a symmetrical position for left-hand rotation, and that it shall cease at the middle of the arc $d\ b$ at $a$, Figure 3. From $f$ to $d$ the braking torque and the driving torque are in opposition, since the current is cut off only at $d$, but it will be seen that at this moment the braking torque is high in proportion to the driving torque, so that the arc $f\ d$ corresponds in reality to a higher efficiency of braking and that the roller 9 reaches the point $d$ at a very low speed. At $d$ the driving torque is suppressed; the braking torque continues alone and by reason of the low speed it ensures with certainty the stopping of the roller between $d$ and $a$.

Braking is obtained by means of a calibrated brake or dashpot employing oil or any other practically incompressible liquid arranged in the following manner:—

The shaft 6 of the motor 5, Figure 1, carries an eccentric 10 which actuates by the connecting rod 28 a plunger piston 29; the latter may carry the latch 4. The angular setting of the eccentric is such that the plunger is at the bottom of its stroke when the roller 9 is at mid-stroke clear of the notches upon the disc, viz, at $a$, Figures 3 and 4. The plunger 29 slides in a cylinder 30 and during its descending movement enters easily into a well 31 filled with oil; a reservoir 32 surmounting the well contains the reserve of oil. The bottom of the well is formed with a hole 33, which connects the bottom of the well 31 with the reservoir 32 through passages 27. This hole 33 is closed by a piston 34 forming a valve and supported by a spring 35.

By reason of this arrangement, during rotation of the shaft 6 of the motor 5, if at the starting position the roller 9 is downwards, the plunger piston 29 is then at the bottom of its stroke. As the shaft revolves, the plunger 29 rises, causing suction beneath it. As soon as the said plunger uncovers the top end of the well 31, oil from the reservoir 32 descends through this orifice and fills the well, being impelled by the atmospheric pressure. The roller 9 and the plunger 29 then reach the top of their strokes and thereafter descend again. As soon as the plunger 29 enters the well 31, the pressure of oil beneath the plunger increases sufficiently to push back the valve 34, this pressure being maintained constant during the whole downward stroke of the plunger 29. It is this constant pressure which creates the braking force. By regulating the spring 35, the desired value can be given to the braking force so that in all cases the kinetic energy of the motor 5 shall be almost entirely absorbed by the time the roller 9 reaches the position $d$, Figures 3 and 4.

It has been mentioned above that during the movement of the roller from $f$ to $d$, the braking torque and the driving torque are in opposition but that nevertheless this arc $f\ d$ corresponds to the highest efficiency of braking. This necessitates that the driving torque shall be small in relation to the braking torque.

Now the driving torque is a function of the speed of the motor. If this motor had a rigorously constant magnetic flux, the driving torque would increase according to a straight-line law whilst the speed decreased until the torque attained its maximum value at nil speed.

Owing to the fact that the magnetic flux increases slightly with the motor current, and likewise by reason of the losses due to hysteresis and Foucault current effects, this straight-line law is slightly altered, but it remains nevertheless true that the torque increases almost in a linear relation as the speed decreases.

But this is true only in stable conditions. When, on the contrary, the speed decreases rapidly, as is the case over the arc $f\ d$, the driving torque increases less slowly than would agree with the law stated above, by reason of the self-induction of the circuits; by judicious selection of this self-induction, matters can be so arranged that during the braking period $f\ d$ the driving torque preserves practically a value corresponding to the speed of the motor at the point $f$ that is to say its normal or lowest value.

Consequently, as a result of the self-induction of the motor circuits, or more exactly by suitably proportioning the time-constant of these circuits to the duration of the time taken for travelling over the arc $f\ d$, it is possible to obtain over this arc an almost total slowing down of the motor, although the driving torque remains and opposes the braking force.

The time-constant can be adjusted by adding a choke or inductance in series with the motor. More simply, a suitable time-constant can be obtained by selecting the resistance of the armature shunt 14 in such a way that at full speed of the motor (at the point $f$) the field magnets shall not be saturated.

The utilization of this phenomenon allows of obtaining over the arc $f\ d$ an effective braking action with a braking torque lower than the maximum motor torque. As a result, it becomes possible, without any other special arrangement, to start up the motor after its stoppage in the arc $d\,a$.

It may be pointed out that in its upward movement, the plunger is subjected to a braking force due to the atmospheric pressure and this force is evidently harmful since it opposes the starting up of the mechanism. But it can be rendered of as low a value as is desired, and negligible in comparison with the driving force, by reducing the cross section of the plunger, which amounts to selecting a fairly high value of the pressure of oil in the well during the braking operation, in practice from 20 to 40 kgs. per square centimetre.

It must be understood that the carrying out of the invention as shown in the drawings is given by way of example, but the mechanism can be constructed in a substantially different manner without departing from the scope of the invention.

For example, the notches cut in the crown of the disc 2 may be otherwise than rectilinear and radial. The essential point is that the roller 9 shall engage them tangentially.

The roller 9 may be replaced by any other suitable member, for example a slide, a cam of suitable profile or any other appropriate part.

The automatic feed of the motor can be obtained otherwise than by two contactors operated by the shaft of the motor; the essential point is that the feed shall depend upon the position and the direction of rotation of this shaft.

The brake may be other than an oil dashpot or the like; there might be utilized in particular a shoe brake or a band brake, operated mechanically or electrically by the driving shaft; the motor might even be braked by causing it to function as a generator.

The operating system forming the subject of the present invention may receive wholly or in part other applications than the actuation of a selector or combiner switch. In a general manner it may be utilized whenever it is desired to actuate the shaft of electrical switching apparatus in a precise and rapid manner through a given angle in any direction, one or more times in a given direction.

What I claim is:—

1. A step-by-step operating system for electrical switching apparatus, comprising an electric motor, a driving shaft adapted to be rotated thereby, a crank carried by said driving shaft, a driven member carried by the shaft to be operated, said driven member having a plurality of equidistant notches, a latching device actuated by said driving shaft, means for applying braking force to said driving shaft, said crank adapted to engage one of said notches and thereby to actuate said driven member during only a fraction of each revolution of said driving shaft, at a speed starting from zero, then increasing and thereafter decreasing without discontinuity, and finally to leave said driven member at rest, said latching device holding said driven member during the remaining part of each revolution of said driving shaft, said braking means acting periodically during each revolution of said driving shaft to stop it gradually at a point in the part of a revolution during which said driven member is not being driven, and electrical contacts controlled by said driving shaft, said contacts ensuring the feed of current to said motor so long as said crank engages a notch in said driven member to actuate said driven member.

2. A step-by-step operating system for electrical switching apparatus, comprising an electric motor, a driving shaft adapted to be rotated thereby, a crank carried by said driving shaft, a driven member carried by the shaft to be operated, said driven member having a plurality of equidistant notches, said notches being radial to said driven member and having parallel faces, a roller mounted upon said crank, said roller adapted to slip accurately into said notches and the circumference described by the axis of said roller during the rotation of said crank being tangential at their extremities to the center lines of two consecutive notches, said roller adapted to engage one of said notches and thereby to actuate said driven member during only a fraction of each revolution of said driving shaft, at a speed starting from zero, then increasing and thereafter decreasing without discontinuity, and finally to leave said driven member at rest, a latching device actuated by said driving shaft and adapted to engage one of said notches at a point opposite said roller, said latching device holding said driven member during the remaining part of each revolution of said driving shaft, braking means acting periodically during each revolution of said driving shaft to stop it gradually at a point in the part of a revolution during which said driven member is not being driven, and electrical contacts controlled by said driving shaft, said contacts ensuring the feed of current to said motor so long as said roller engages a notch in said driven member to actuate said driven member.

3. A step-by-step operating system for electrical switching apparatus, comprising an electric motor, a driving shaft adapted to be rotated thereby, a crank carried by said driving shaft, a driven member carried by the shaft to be operated, said driven member having a plurality of equidistant notches, a latching device actuated by said driving shaft, means for applying braking force to said driving shaft, said crank adapted to engage one of said notches and thereby to actuate said driven member during only a fraction of each revolution of said driving shaft, at a speed starting from zero, then increasing and thereafter decreasing without discontinuity, and finally to leave said driven member at rest, said latching device adapted to engage successively in said notches and thereby to hold said driven member during the remaining part of each revolution of said driving shaft, said braking means acting periodically during each revolution of said driving shaft to stop it gradually at a point in the part of a revolution during which said driven member is not being driven, and electrical contacts controlled by said driving shaft, said contacts ensuring the feed of current to said motor so long as said crank engages a notch in said driven member to actuate said driven member.

4. A step-by-step operating system for electrical switching apparatus, comprising an electric motor, a driving shaft adapted to be rotated thereby, a crank carried by said driving shaft, a driven member carried by the shaft to be operated, said driven member having a plurality of equidistant notches, a latching device actuated by said driving shaft, means for applying braking force to said driving shaft, said crank adapted to engage one of said notches and thereby to actuate said driven member during only a fraction of each revolution of said driving shaft, at a speed starting from zero, then increasing and thereafter decreasing without discontinuity, and finally to leave said driven member at rest said latching device holding said driven member during the remaining part of each revolution of said driving shaft, said braking means acting periodically during each revolution of said driving shaft to stop it gradually at a point in the part of a revolution during which said driven member is not being driven, said braking means acting to stop said driving shaft simultaneously with said motor acting to rotate said shaft during the latter part of the movement of the shaft to be operated, whereby the speed of said motor is reduced at the end of said movement, and electrical contacts controlled by said driving shaft, said contacts ensuring the feed of current to said motor so long as said crank engages a notch in said driven member to actuate said driven member.

5. A step-by-step operating system for electrical switching apparatus, comprising a series-wound electric motor having two field windings, each of said windings serving for a given direction of rotation, a driving shaft adapted to be rotated by said motor, a crank carried by said driving shaft, a driven member carried by the shaft to be operated, said driven member having a plurality of equidistant notches, a latching device actuated by said driving shaft, means for applying braking force to said driving shaft, said crank adapted to engage one of said notches and thereby to actuate said driven member during only a fraction of each revolution of said driving shaft, at a speed starting from zero, then increasing and thereafter decreasing without discontinuity, and finally to leave said driven member at rest, said latching device holding said driven member during the remaining part of each revolution of said driving shaft, said braking means acting periodically during each revolution of said driving shaft to stop it gradually at a point in the part of a revolution during which said driven member is not being driven, and electrical contacts controlled by said driving shaft, said contacts ensuring the feed of current to said motor so long as said crank engages a notch in said driven member to actuate said driven member.

6. A step-by-step operating system for electrical switching apparatus, comprising a series-wound electric motor having two field windings, each of said windings serving for a given direction of rotation, a resistance in shunt to the armature of said motor, said resistance adapted to give said motor a speed characteristic substantially that of a shunt-wound machine, a driving shaft adapted to be rotated by said motor, a crank carried by said driving shaft, a driven member carried by the shaft to be operated, said driven member having a plurality of equidistant notches, a latching device actuated by said driving shaft, means for applying braking force to said driving shaft, said crank adapted to engage one of said notches and thereby to actuate said driven member during only a fraction of each revolution of said driving shaft, at a speed starting from zero, then increasing and thereafter decreasing without discontinuity, and finally to leave said driven member at rest, said latching device holding said driven member during the remaining part of each revolution of said driving shaft, said braking means acting periodically during each revolution of said driving shaft to stop it gradually at a point in the part of a revolution during which said driven member is not being driven, and electrical contacts controlled by said driving shaft, said contacts ensuring the feed of current to said motor so long as said crank engages a notch in said driven member to actuate said driven member.

7. A step-by-step operating system for electrical switching apparatus, comprising a series-wound electric motor having two field windings, each of said windings serving for a given direction of rotation, a resistance in series with each of said field windings, a driving shaft adapted to be rotated by said motor, a crank carried by said driving shaft, a driven member carried by the shaft to be operated, said driven member having a plurality of equidistant notches, a latching device actuated by said driving shaft, means for applying braking force to said driving shaft, said crank adapted to engage one of said notches and thereby to actuate said driven member during only a fraction of each revolution of said driving shaft, at a speed starting from zero, then increasing and thereafter decreasing without discontinuity, and finally to leave said driven member at rest, said latching device holding said driven member during the remaining part of each revolution of said driving shaft, said braking means acting at each revolution of said driving shaft to stop it gradually at a point in the part of a revolution during which said driven member is not being driven, a master switch adapted to supply current to said motor through either of said resistances and the respective field winding, and electrical contacts controlled by said driving shaft, said contacts ensuring the feed of current to said motor without passing through said resistances so long as said crank engages a notch to actuate said driven member, whereby the feed through said contacts dominates the supply from said master switch in any event.

8. A step-by-step operating system for electrical switching apparatus, comprising an electric motor, a driving shaft adapted to be rotated thereby, a crank carried by said driving shaft, a driven member carried by the shaft to be operated, said driven member having a plurality of equidistant notches, a latching device actuated by said driving shaft, means for applying braking force to said driving shaft, said crank adapted to engage one of said notches and thereby to actuate said driven member during only a fraction of each revolution of said driving shaft, at a speed starting from zero, then increasing and thereafter decreasing without discontinuity, and finally to leave said driven member at rest, said latching device holding said driven member during the remaining part of each revolution of said driving shaft, said braking means acting periodically during each revolution of said driving shaft to stop it gradually at a point in the part of a revolution during which said driven member is not being driven, said braking means acting to stop said driving shaft simultaneously with said motor acting to rotate said shaft during the latter part of the movement of the shaft to be operated, whereby the speed of said motor is reduced at the end of said movement, and electrical contacts controlled by said driving shaft, said contacts ensuring the feed of current to said motor so long as said crank engages a notch in said driven member to actuate said driven member, the time constant of the motor circuits being regulated so that the motor torque upon said driving shaft retains a low value during the time that it is in opposition to the braking torque upon said driving shaft.

9. A step-by-step operating system for electrical switching apparatus, comprising a series-wound electric motor having two field windings, each of said windings serving for a given direction of rotation, a resistance in shunt to the armature of said motor, said resistance adapted to give said motor a speed characteristic substantially that of a shunt-wound machine, a driving shaft adapted to be rotated by said motor, a crank carried by said driving shaft, a driven member carried by the shaft to be operated, said driven member having a plurality of equidistant notches, a latching device actuated by said driving shaft, means for applying braking force to said driving shaft, said crank adapted to engage one of said notches and thereby to actuate said driven member during only a fraction of each revolution of said driving shaft, at a speed starting from zero, then increasing and thereafter decreasing without discontinuity, and finally to leave said driven member at rest, said latching device holding said driven member during the remaining part of each revolution of said driving shaft, said braking means acting at each revolution of said driving shaft to stop it gradually at a point in the part of a revolution during which said driven member is not being driven, said braking means acting to stop said driving shaft simultaneously with said motor acting to rotate said shaft during the latter part of the movement of the shaft to be operated, whereby the speed of said motor is reduced at the end of said movement, and electrical contacts controlled by said driving shaft, said contacts ensuring the feed of current to said motor so long as said crank engages a notch in said driven member to actuate said driven member, the time constant of the motor circuits being regulated so that the motor torque upon said driving shaft retains a low value during the time that it is in opposition to the braking torque upon said driving shaft, the regulation of said time constant being obtained by choosing such a value for said armature shunt resistance that said field windings shall be at low saturation when the operation of said braking means begins.

In testimony whereof I hereunto affix my signature.

LÉON HEIDMANN.